United States Patent
Burrows et al.

[19]

[11] Patent Number: 6,108,965
[45] Date of Patent: Aug. 29, 2000

[54] TRAP FOR CATCHING INSECTS

[75] Inventors: John Allen Burrows, Solihull; Mathew Varghese Kaye, Sedgley; Paul Shapland, Coulsdon, all of United Kingdom

[73] Assignee: Brandenburg Limited, United Kingdom

[21] Appl. No.: 09/097,213

[22] Filed: Jun. 12, 1998

[30] Foreign Application Priority Data

Apr. 3, 1998 [GB] United Kingdom ................... 9807169

[51] Int. Cl.[7] ............................. A01M 1/04; A01M 1/14
[52] U.S. Cl. ................................................ 43/113; 43/114
[58] Field of Search .............................. 43/107, 113, 114; 362/255, 244, 246, 355, 357, 240; 313/113, 114

[56] References Cited

U.S. PATENT DOCUMENTS

| | | | |
|---|---|---|---|
| 391,014 | 10/1888 | Bosse | 43/114 |
| 1,040,814 | 10/1912 | Tobias | 362/355 |
| 1,213,154 | 12/1917 | Cohen | 362/355 |
| 1,251,211 | 12/1917 | Forger | 362/355 |
| 1,269,978 | 6/1918 | Suess | 362/355 |
| 1,273,580 | 7/1918 | Cohen | 362/355 |
| 1,298,342 | 3/1919 | Hillyer | 362/355 |
| 1,440,301 | 12/1922 | Klein | 362/355 |
| 1,655,128 | 1/1928 | Berghorn | 43/114 |
| 1,990,287 | 2/1935 | Jones et al. | 362/355 |
| 2,170,682 | 8/1939 | Frech et al. | 362/246 |
| 2,740,216 | 4/1956 | Lieberman | 362/355 |
| 3,225,241 | 12/1965 | Spencer et al. | 313/113 |
| 3,358,138 | 12/1967 | Trantina | 362/355 |
| 3,729,858 | 5/1973 | Bradshaw | 43/114 |
| 3,755,958 | 9/1973 | Bradshaw | 43/114 |
| 3,922,073 | 11/1975 | Schwartz | 362/355 |
| 4,045,665 | 8/1977 | Williams et al. | 362/355 |
| 4,074,457 | 2/1978 | Sato et al. | 43/113 |
| 4,117,624 | 10/1978 | Phillips | 43/113 |
| 4,127,961 | 12/1978 | Phillips | 43/113 |
| 4,434,455 | 2/1984 | Merritt | 362/355 |
| 4,654,998 | 4/1987 | Clay | 43/113 |
| 4,876,822 | 10/1989 | White | 43/113 |
| 4,901,207 | 2/1990 | Sato et al. | 362/244 |
| 4,941,074 | 7/1990 | DeCosse et al. | 362/244 |
| 4,949,501 | 8/1990 | Larkin | 43/113 |
| 4,959,924 | 10/1990 | Martin | 43/114 |
| 5,170,583 | 12/1992 | Coaker et al. | 43/107 |
| 5,251,397 | 10/1993 | Exum et al. | 43/115 |
| 5,301,458 | 4/1994 | Deyoreo et al. | 43/139 |

(List continued on next page.)

FOREIGN PATENT DOCUMENTS

| | | | |
|---|---|---|---|
| 378495 | 10/1907 | France | 43/113 |
| 522094 | 3/1931 | Germany . | |
| 704573 | 12/1979 | U.S.S.R. | 43/113 |
| 1468487 | 3/1989 | U.S.S.R. | 43/113 |
| 2171882 | 9/1986 | United Kingdom | 43/113 |
| 2275409 | 8/1994 | United Kingdom | 43/113 |

*Primary Examiner*—Robert P. Swiatek
*Assistant Examiner*—Darren W. Ark
*Attorney, Agent, or Firm*—Baker & McKenzie

[57] ABSTRACT

An improved trap for catching insects that combines the use of attractant light and a sticky surface to trap the insects is provided. The trap includes a base, a dark colored insect trapping insert, a screen, a light source, and a cover housing. The insect trapping insert is secured to the base and has a sticky substance deposited on its exposed surfaces. The screen is arranged above the insect trapping insert in the insect trap in order to conceal at least a portion of the insect trapping insert. This serves to limit the extent which trapped insects are visible to individuals who pass by the insect trap. The light source, which typically comprises an ultraviolet light emitting fluorescent tube, is positioned above the screen and serves to attract insects. The base, insect trapping insert, screen and light source are covered with the cover housing. The cover housing is formed from a clear, translucent or opaque plastic and has a roughened inside surface which serves to increase the output of ultraviolet light from the insect trap.

12 Claims, 2 Drawing Sheets

U.S. PATENT DOCUMENTS

| | | | |
|---|---|---|---|
| 5,311,696 | 5/1994 | Gauthier et al. | 43/113 |
| 5,353,542 | 10/1994 | Vaudry | 43/113 |
| 5,425,197 | 6/1995 | Smith | 43/113 |
| 5,505,017 | 4/1996 | Nelson et al. | 43/113 |
| 5,513,465 | 5/1996 | Demarest et al. | 43/113 |
| 5,608,987 | 3/1997 | Meyer | 43/113 |
| 5,651,211 | 7/1997 | Regan et al. | 43/113 |
| 5,692,824 | 12/1997 | Ooishi | 362/240 |
| 5,833,355 | 11/1998 | You et al. | 362/244 |
| 5,836,674 | 11/1998 | Nishitani et al. | 362/244 |
| 5,861,990 | 1/1999 | Tedesco | 362/355 |

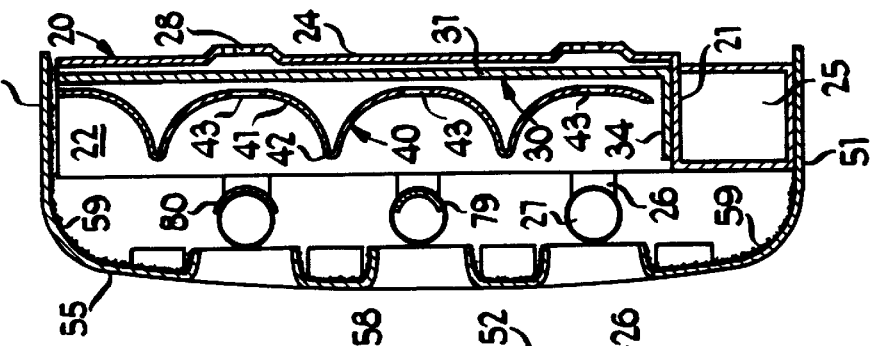
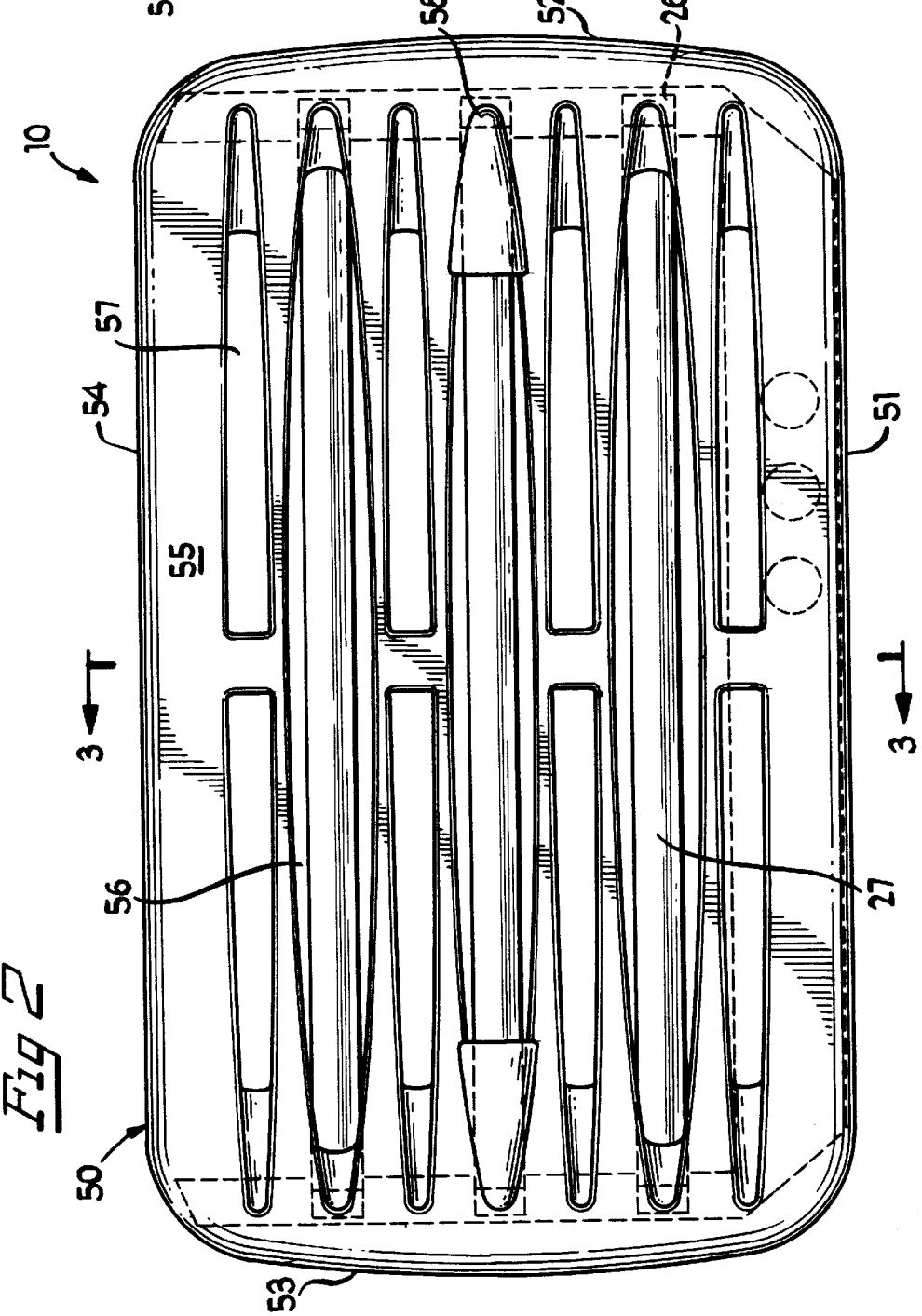

TRAP FOR CATCHING INSECTS

BACKGROUND OF THE INVENTION

1. Field of the Invention

This invention relates broadly to a trap for catching insects, and in particular, relates to an insect trap that contains a light source which attracts insects and a surface covered with a sticky material upon which insects become stuck and die.

2. Description of the Related Art

There have been many devices proposed for insect control as insects are a nuisance and can present health and sanitation problems, especially in the food preparation areas of homes and commercial establishments. It has been well known for some time that insects of many kinds can be killed by being attracted to a sticky surface upon which they then get stuck and die. Fly paper is the best known example of this method of insect control. It has also been known for some time that various light sources can be used to attract insects. Accordingly, a number of insect trapping devices have been developed which combine the use of attractant light and a sticky surface to trap the insects. For example, U.S. Pat. Nos. 5,651,211, 5,513,465, 5,505,017, 5,425,197, 5,251,397, and 4,074,457 all disclose insect trapping devices which combine the use of a light source and an adhesive trapping material.

While some versions of this type of insect trapping device have achieved widespread use, the presently available devices do suffer from various disadvantages. For example, these devices often include an adhesive trapping material that is visible to individuals who pass by the insect trap. After significant periods of use, these adhesive trapping materials will have entrapped a number of insects. It can be readily appreciated that used adhesive trapping materials can present a rather unpleasant appearance which may be especially troublesome to the owners of commercial establishments as customers may question the cleanliness of the establishment.

In addition, many versions of this type of insect trapping device are designed for continuous use and therefore, it is particularly important that these devices are designed to achieve optimum operating efficiencies as continuous use can impact electricity costs. However, many of the prior insect trapping devices suffer from designs which do not address the problem of less than optimum operating efficiencies. For example, many of these designs include components which hinder illumination and result in decreased insect attraction. Problems with decreased illumination may lead the user to select higher power illumination sources which often tend to increase electricity costs.

For the foregoing reasons, there is a need for an improved insect trap which solves the problems associated with the unpleasant appearance of adhesive materials used in known insect traps and which also solves the problem of less than optimum operating efficiency in known insect traps.

It is therefore a primary objective of the present invention to provide an improved trap for catching insects which uses a light source as an insect attractant and an adhesive trapping material for catching the insects.

It is a further objective of the present invention to provide an improved trap for catching insects which is capable of maintaining a pleasant appearance after long periods of use.

It is another objective of the present invention to provide an improved trap for catching insects which provides for increased operating efficiencies.

SUMMARY OF THE INVENTION

The present invention is directed to an insect trap that satisfies the need for an improved trap for catching insects which is capable of maintaining a pleasant appearance after long periods of use and which provides for increased operating efficiencies. A trap for catching insects having the features of the present invention broadly comprises a base, an insect trapping insert, a screen, a light source, and a cover housing.

The base of the insect trap includes a bottom wall, a pair of opposed side walls, and a back wall. The opposed side walls and the back wall extend upwardly from the bottom wall and define a generally three sided enclosure which is open at the top and front. The insect trapping insert has a bottom panel, a back panel, and optionally, a pair of opposed side panels. The back panel and any opposed side panels extend upwardly from the bottom panel and define the insert. The insect trapping insert is secured in the base so that the bottom panel and the back panel of the insert are in overlying relationship to the bottom wall and the back wall of the base. The insect trapping insert includes a sticky substance which is deposited on the exposed surfaces of the trapping insert. The insect trapping insert has a darkened appearance which may be achieved by (1) forming the bottom, top and side panels from a dark colored material and applying a clear or dark colored sticky substance to the panels, or (2) by applying a dark colored sticky substance to the panels. Insects attracted to the insect trap become stuck in the sticky substance and eventually die.

The screen of the insect trap has at least one opening and in one version, includes at least two elongated ridges and at least one elongated slot between the ridges. The screen is arranged in front of the insect trapping insert in the insect trap in order to conceal at least a portion of the insect trapping insert. This serves to limit the extent which trapped insects are visible to individuals who pass by the insect trap.

The light source of the insect trap is preferably at least one fluorescent tube which emits ultraviolet light. The fluorescent tube is positioned in front of the screen and is mounted on side walls of the base. The light source is preferably AC powered but may also be DC powered.

The cover housing of the insect trap is mounted on the base so as to substantially cover the base, the light source, the screen and the insect trapping insert. The cover housing is capable of transmitting light from the light source and has at least one opening through which insects can pass. The cover housing is formed from a transparent plastic, translucent plastic or opaque plastic and may have a roughened inside surface. If the cover has a roughened inside surface, the cover housing is mounted on the base so that the roughened inside surface is in facing relationship with the fluorescent light source. It has been discovered that by roughening the inside surface of the cover housing, the ultraviolet light emitted from the fluorescent tube is magnified or alternatively, a higher amount of UV light will be produced for any given wattage of light source. Therefore, it is possible to use lower power light sources in the insect trap of the present invention and still achieve outstanding insect attraction and operating efficiencies.

BRIEF DESCRIPTION OF THE DRAWINGS

These and other features, aspects, objectives, and advantages of the present invention will be become better understood upon consideration of the following detailed description, appended claims and accompanying drawings where:

FIG. 2 is a front view of an insect trap made in accordance with the present invention in a fully assembled condition; and FIG. 3 is a side sectional view of an insect trap made in accordance with the present invention taken along line 3—3 of FIG. 2.

Figure 1:
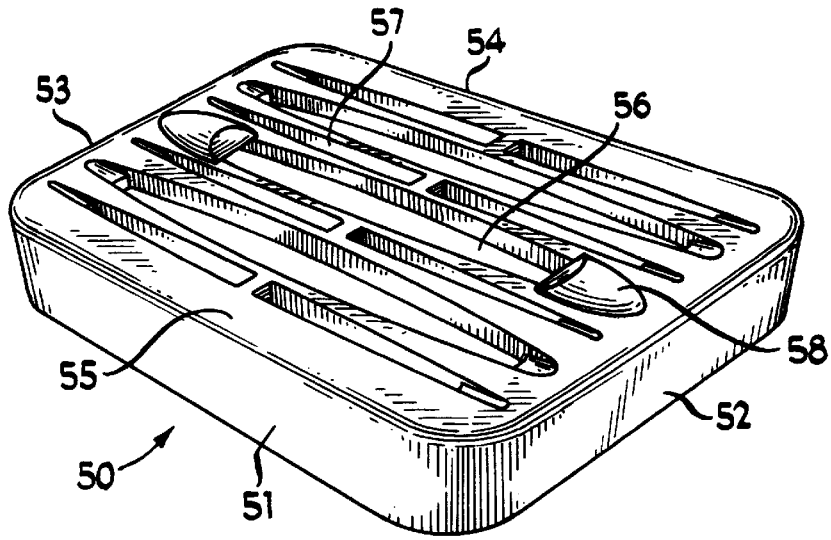
FIG. 1 is an exploded perspective view of an insect trap made in accordance with the present invention.
Figure 1:
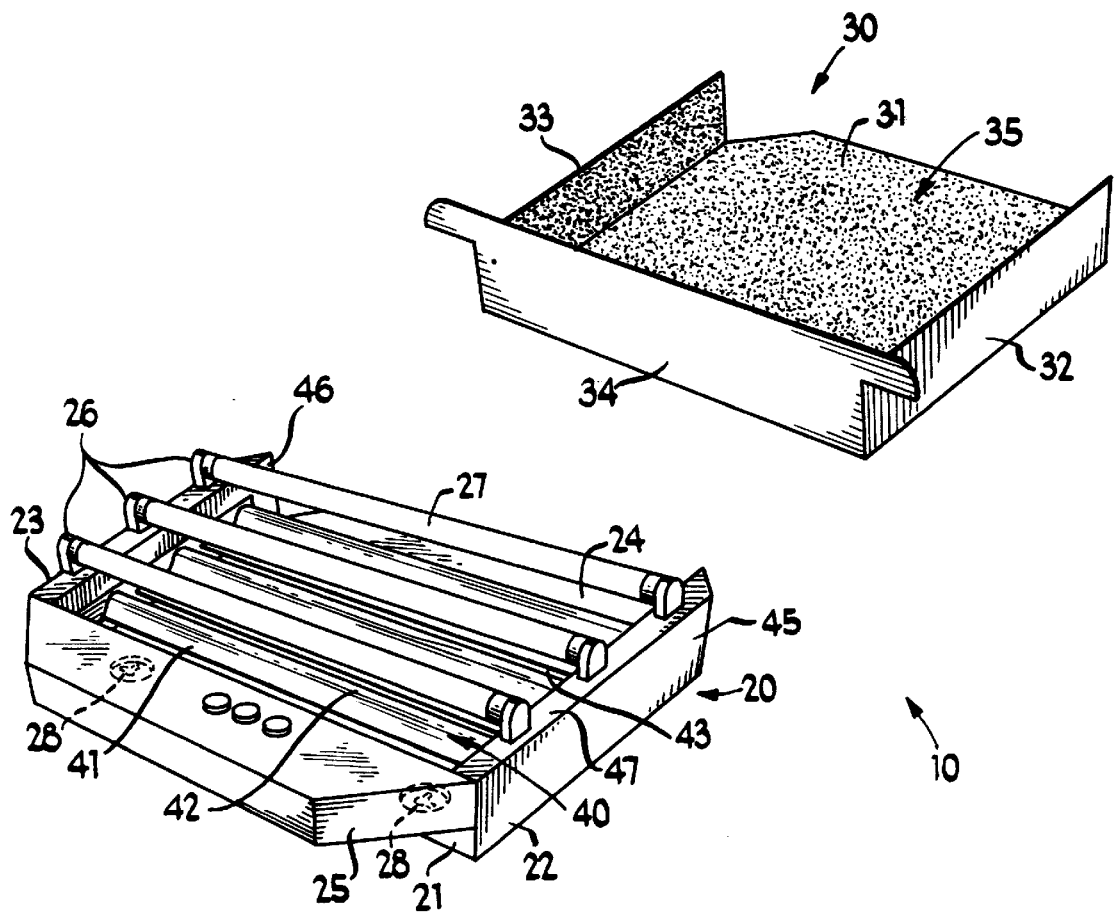

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DESCRIPTION OF THE PREFERRED EMBODIMENTS

Referring now to FIGS. 1–3, there is shown an insect trap generally indicated at 10. The insect trap 10 broadly comprises a base 20, an insect trapping insert 30, a screen 40, and a cover housing 50.

The base 20 includes a bottom wall 21, a pair of opposed side walls 22 & 23, a back wall 24, and a lower compartment 25. It can be seen from FIGS. 1 and 3 that the opposed side walls 22,23 and the back wall 24 extend upwardly from the bottom wall 21 and that the opposed side walls 22,23, the bottom wall 21, and the back wall 24 meet at their edges to form a three sided enclosure which is open at the front and top. The opposed side walls 22,23 each include an outer surface 45, an inner surface 46, and a top surface 47. Also shown in FIG. 1 in phantom are mounting slots 28 which are formed in the back wall 24 of the base 20. The mounting slots 28 are configured so that they may be placed over headed fasteners which have been inserted into a wall surface. The mounting slots 28 are positioned over the headed fasteners in order to secure the insect trap to a wall surface. The insect trap 10 may also be operated as a free standing unit or may be operated in a suspended position. The base 20 is preferably constructed from a corrosion resistant material such as zinc plated steel, but non-metallic materials would also be suitable.

In the embodiment shown in FIG. 1, three electric sockets 26 are mounted on the top surface 47 of each of the opposed walls 22,23 and three fluorescent tubes 27 are installed between each pair of electrical sockets 26. The space defined by the outer surface 45 and inner surface 46 of the opposed side walls 22,23 provides a convenient conduit for the electrical wiring used to supply electricity to the electrical sockets 26. While the preferred embodiment of the insect trap shown uses a fluorescent tube which emits ultraviolet light as a light source, it can be appreciated that other light sources would be suitable for use in the invention such as incandescent bulbs or light emitting diodes. In the embodiment shown, the ends of each fluorescent tube 27 are inserted into a pair of sockets 26, which are connected, by means of the usual circuitry, to a source of electric power. Of course, other arrangements of the sockets 26 and fluorescent tubes 27 are possible. For instance, U-shaped or circular tubes which mount in or on a single socket would be suitable.

Referring specifically to FIG.3, it can also be seen that the fluorescent tubes 27 may include an internal coating 79 or external shielding 80. The internal coating 79 is an ultraviolet reflective coating which serves to prevent ultraviolet light from passing through the coating and serves to enhance the emission of ultraviolet light through the uncoated areas of the fluorescent tube 27. The external shielding 80 may be paint, adhesive tape, or a metallic shield which covers a portion of the circumference of the fluorescent tube 27. The external shielding 80 also serves to prevent ultraviolet light from passing through the coating and to enhance the emission of ultraviolet light through the uncoated areas of the fluorescent tube 27.

By preventing the passage of ultraviolet light through a portion of the fluorescent tubes 27 which face the insect trapping insert 30, the internal coating 79 and/or external shielding 80 on the fluorescent tubes 27 serve to solve a well known problem in this field. Specifically, one of the common problems with using adhesive to catch/trap insects is that most commercially available adhesives cure when the adhesive is exposed to ultraviolet light. When the adhesive cures, it becomes hard and therefore, becomes ineffective at trapping insects. One solution has been to add UV stabilizers to the adhesives used in trapping insects; however, the use of high levels of UV stabilizer in an adhesive often leads to a lack of tackiness in the adhesive. The use of UV light shielding mechanisms such as the internal coating 79 and external shielding 80 on the fluorescent tubes 27 serves to limit the impingement of UV light on the insect trapping adhesives of the insect trap 10 which thereby alleviates the problem of UV curing of the adhesive.

Alternating current from a wall socket is the preferred and expected type of power source for the insect trap, but, with appropriate circuitry, the use of DC current from batteries is also feasible. The bottom wall 21 of the base 20 includes a lower compartment 25 which provides a convenient space for the electric circuitry, such as the main on-off switch for the light sources, and if desired, may house batteries when the insect trap is DC powered.

The insect trapping insert 30 of the insect trap 10 includes a bottom panel 31, a pair of opposed side panels 32 & 33, and a back panel 34. It can be seen from FIG. 1 that the opposed side panels 32,33 and the back panel 34 extend upwardly from the bottom panel 31 and that when assembled, the opposed side panels 32,33, the bottom panel 31, and the back panel 34 meet at their edges to form a three sided enclosure which is open at the front and top. In another version of the invention, the insect trapping insert 30 only includes a bottom panel 31 and a back panel 34. The panels of the insert 30 are preferably manufactured from a black UV-stabilized cardboard but may also be manufactured from different materials and materials of a different color.

The inside surfaces of the opposed side panels 32,33, the bottom panel 31, and the back panel 34 of the insect trapping insert 30 are coated with an adhesive coating or sticky substance 35. Preferably, the sticky substance is an FDA approved material that has been UV stabilized for exposure to ultraviolet light. It is also preferred that the sticky substance 35 be pigmented so that it has a dark color which produces a darkened appearance when applied to the insect trapping insert 30. However, as noted above, the sticky substance may be clear so as to not hide the color of the side, top and bottom panels of the insect trapping insert. As used herein, the term "dark color" refers to a color having a low tendency to reflect incident light and the term "darkened appearance" refers to an appearance which does not readily reflect incident light. The darkened appearance of the insect trapping insert 30 serves to minimize the extent to which the insects trapped on the sticky surface of the insect trapping insert 30 are visible to individuals who pass by the insect trap. The sticky substance 35 is generally deposited about the entire inside surface of the opposed side panels 32,33, the bottom panel 31, and the back panel 34; however, regions at the edge of each inside surface may include a border area that is free from adhesive. These adhesive-free borders facilitate the removal of release paper that may be applied to the adhesive areas during manufacture of the insect trapping insert 30.

During assembly of the insect trap 10 as shown in FIGS. 1 and 3, the insect trapping insert 30 is arranged in the base 20 so that the bottom panel 31 and the back panel 34 of the insect trapping insert 30 are in overlying relationship to the bottom wall 21 and the back wall 24 of the base 20 respectively. In addition, the insect trapping insert 30 is arranged in the insect trap 10 so that the light source 27 overlies the insect trapping insert 30. In this manner, an insect may be trapped on the sticky substance 35 after being attracted by the fluorescent tubes 27. The insect trapping insert 30 may be secured to the base 20 by suitable means such as adhesive or a press fit if the insect trapping insert 30 and the base 20 are precisely dimensioned. It is preferable that the insect trapping insert 30 be removable from the insect trap 10 as this allows the user to discard an old dirty insect trapping insert and replace it with a new insect trapping insert when desired.

Referring to FIGS. 1 and 3, one version of the screen 40 of the insect trap 10 is shown. The screen 40 preferably has a curvilinear shape and in the version shown, includes elongated ridges 41 and elongated slots 43 between the ridges 41. The ridges 41 shown are curvilinear and create a peak 42 which is positioned between adjacent fluorescent tubes 27. The screen 40 may be secured in the insect trap 10 by any number of different means. For instance, in a version of the invention wherein the insect trapping insert 30 has opposed side walls, the screen 40 may be installed by selecting a screen 40 of appropriate size and placing the ends of the screen 40 in the sticky substance 35 of the insect trapping insert 30 so that the screen 40 is bonded to the insect trapping insert 30. Alternatively, the screen 40 may be installed in the insect trap 10 by securing the ends of the screen 40 to the side walls 22,23 of the base 20. Numerous methods are available for securing the screen 40 to the base 20 such as fastening the screen to the base with screws, welding the screen to the base, securing the screen to notches or tabs on the opposed side walls of the base.

Regardless of the method chosen to secure the screen 40 in the insect trap 10, the screen 40 should be installed so that the screen 40 is positioned between the light source, i.e., fluorescent tubes 27, and the insect trapping insert 30. By installing the screen 40 over (or in front of) the insect trapping insert 30, the screen 40 can conceal at least a portion of the insect trapping insert 30. In this manner of installation, the screen 40 limits the extent to which trapped insects are visible from the front of the insect trap 10. It can also be seen from FIGS. 1–3 that in the version of the insect trap shown, the screen 40 is mounted in the insect trap 10 so that the elongated ridges 41 of the screen 40 are in spaced, substantially parallel relationship with each of the fluorescent tubes 27. In this arrangement, insects trapped on the sticky substance 35 will not be visible to a passerby as the screen 40 covers a portion of the insect trapping insert 30 and the fluorescent tubes 27 cover the elongated slots 43 in the screen 40.

Referring to FIGS. 1–3, one version of the cover housing 50 of the insect trap 10 is shown. The cover housing 50 has a bottom wall 51, a pair of side walls 52 & 53 and a top wall 54. The bottom wall 51, side walls 52,53 and top wall 54 extend rearward at substantially right angles from a front face 55. In the version of the cover housing 50 shown, the front face 55 includes openings or slots 56, which extend from a location near side wall 52 to a location near side wall 53, and openings or slots 57, which extend from a location near the center line of the front face 55 to a location near side wall 52 or a location near aide wall 53. Optionally, the cover housing 50 may include one or more cartridges 58 which contain an insect attractant chemical such as a pheromone. The cover housing 50 is formed from a polymeric material that transmits at least a portion of the light emitted from the fluorescent tubes 27, and preferably is formed from a transparent plastic, a translucent plastic or an opaque plastic. Most preferably, the cover housing is formed from an acrylic polymer.

Referring now specifically to FIG. 3, it can be seen that the cover housing 50 also includes an inner surface 59 having a roughened surface. As used herein, the term "roughened surface" means a surface that is broken, uneven, textured, bumpy or otherwise does not have a smooth profile. Such a surface may be formed by sandblasting or molding the plastic cover housing using a mold with a textured surface. It has been discovered that by providing the cover housing 50 with a roughened inner surface 59 which is in facing relationship with the fluorescent tubes 27, the transmission of light from the fluorescent tubes 27 through the cover housing 50 can be enhanced. While not wanting to be bound by theory, it is believed that the roughened surface acts as a magnifier of the light from the light source.

In order to test the effect of different cover housings on the ultraviolet light output of the insect trap, ultraviolet light output tests were conducted. The testing was performed on an insect trap fitted with three 25 W BL 350 lamps. The sensor was set on the horizontal and vertical center lines of the insect trap at a distance of one meter. The following results were obtained.

| Insect Trap Configuration | UV Light Output (microwatts/cm$^2$) |
| --- | --- |
| Trap without Cover | 210 |
| Trap with Transparent Cover | 224 |
| Trap with Cover Having Roughened Inside Surface | 244 |
| Trap with White Cover | 207 |

It can be seen that the insect trap with a cover having a roughened inside surface had the greatest UV light output and exhibited a 16% increase in UV light output over the trap having no cover. Therefore, it is evident that an insect trap having a cover with a roughened inside surface will be more energy efficient as it will produce a higher amount of UV light for any given wattage of light source. The cover housing also substantially covers the components of the insect trap and provides a pleasing aesthetic appearance yet at the same time retains the ability to transmit light. In addition, the enhanced transmission of light allows the user of the insect trap to achieve acceptable levels of transmitted light even with the installation of lower wattage light sources. This can lead to significant cost savings especially in view of the likelihood that the insect trap will be used for long periods of time.

FIG. 2 shows the typical installation of the cover housing 50 over the base 20 of the insect trap 10. The cover housing 50 and the base 20 may be configured so that the cover housing 50 may be press fit or snap fitted over the base 20. Alternatively, suitable means for attaching the cover housing 50 to the base 20, such as screws dimensioned to mate with threaded inserts in the base 20, may be used to install the cover housing 50 on the base 20. It can be seen that the cover housing 50 substantially covers the base 20, the fluorescent tubes 27, the insect trapping insert 30, and the screen 40. In the version shown, the cover housing 50 is mounted on the base 20 so as to surround the bottom wall 21 and opposed side walls 22,23 of the base 20 and so that each of the elongated openings 56 of the cover housing 50 is in substantially parallel relationship with each fluorescent tube 27. In this manner, the total light transmitted from the insect trap 10 includes a portion of light from each fluorescent tube 27 which passes unimpeded through the openings 56 in the cover housing 50.

In operation, the insect trap 10 is typically mounted on a wall surface. The fluorescent tubes 27 are energized by connecting the electric plug to the alternating current from a wall socket or alternatively, to a source of DC current. The ultraviolet light from the fluorescent tubes 27 and any insect attractant chemical on the cover housing attract the insects, which fly through the openings 56,57 in the cover housing 50. The insects continue on through the slots 43 in the screen 40 and encounter the sticky substance 35 on the insect trapping insert 30. The insects become stuck on the sticky substance 35 and eventually die. Advantageously, the configuration of the cover housing 50, the screen 40 and the dark sticky substance 35 on the insect trapping material 30 conceals trapped insects so as to limit the visibility of the trapped insects to individuals passing by the insect trap.

Thus, it is seen that an improved insect trap is provided which satisfies the need for an improved insect trap which solves the problems associated with the unpleasant appearance of adhesive materials used in known insect traps and which also solves the problem of less than optimum operating efficiency in known insect traps. The combination of a dark color insect trapping insert and a screen in the insect trap assists in limiting the visibility of trapped insects on the insect trapping insert. The use of a cover housing having a roughened inside surface serves to increase the transmission of light from the insect trap and thereby increases the operating efficiencies of the insect trap of the present invention. In addition, the use of UV light shielding mechanisms such as internal and external coatings on the UV light source serves to limit the impingement of UV light on the insect trapping adhesives of the insect trap which thereby alleviates the problem of UV curing of the adhesive.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A trap for catching insects comprising:

a base;

means for catching insects removably secured to the base;

a light source mounted on the base in overlying relationship to the means for catching insects; and a cover housing made of plastic capable of transmitting light through the cover housing from the light source to areas adjacent to said trap, the cover housing having at least one opening through which insects can pass and having a roughened inside surface, the cover housing being mounted on the base so that the inside surface is in facing relationship with the light source, and the cover housing being mounted on the base so as to substantially cover the base, the light source, and the means for catching insects.

2. The trap of claim 1 further including:

a screen for concealing at least a portion of the means for catching insects, the screen being positioned between the light source and the means for catching insects.

3. The trap of claim 1 wherein the means for catching insects is an insect trapping insert comprising a material having a sticky substance applied to an exposed surface.

4. The trap of claim 3 wherein the insect trapping insert has a dark color.

5. A trap for catching insects comprising:

a base;

an insert carrying an adhesive capable of catching insects, said insert being removably secured to the base;

an ultra violet light source mounted on the base in overlying relationship to the insert; and a screen concealing a major portion of the insert, the screen being positioned between the light source and the insert, and said screen having openings which allow passage of said insects through said screen to said insert, a cover housing capable of transmitting from the light source and having at least one opening through which insects can pass, the cover housing being mounted on the base so as to substantially cover the base, the light source, the screen and the insert, the insert having a dark color, the cover housing is made of a plastic through which the ultra violet light source is capable of shining and the housing having a roughened inside surface, the cover housing being mounted on the base so that the inside surface is in facing relationship with the light source, the cover housing comprising a material selected from the group consisting of transparent plastics and translucent plastics.

6. The trap of claim 5 wherein the light source comprises an electric plug connected to at least one fluorescent tube, the electric plug being constructed to fit into an electrical socket powered with electric current.

7. The trap of claim 6 wherein said at least one fluorescent tube includes a masking means on a portion of the fluorescent tube facing the insert, the masking means preventing at least a part of the ultraviolet light from passing through the portion of the fluorescent tube.

8. The trap of claim 7 wherein the cover housing further includes an insect attractant chemical.

9. The trap of claim 8 further including:

means for mounting the base to a wall surface comprising at least one headed fastener adapted to protrude from the wall surface and at least one slot in the base for receiving the fastener and securely positioning the trap on the wall surface.

10. The trap of claim 9 wherein:

the base comprises a bottom wall, a pair of opposed side walls, and a back wall, the opposed side walls and the back wall extending upwardly from the bottom wall; and the insert comprises a bottom panel and a back panel, the back panel extending upwardly from the bottom panel, the insert being removably secured in the base so that the bottom panel and the back panel are in overlying relationship to the bottom wall and the back wall of the base respectively; and said at least one fluorescent tube of the light source has two ends, each of the ends of the at least one fluorescent tube being mounted on one of the side walls of the base respectively.

11. The trap of claim 10 wherein the screen includes at least two elongated ridges and at least one elongated slot between the ridges, the screen being mounted on the base so that said at least one fluorescent tube and the elongated ridges are in spaced, substantially parallel relationship.

12. The trap of claim 11 wherein the cover housing includes at least one elongated opening, the cover housing being mounted on the base so as to surround the bottom wall and opposed side walls of the base and so that said at least one elongated opening is in substantially parallel relationship with said at least one fluorescent tube.

\* \* \* \* \*